United States Patent
Schlick et al.

(10) Patent No.: US 6,804,168 B2
(45) Date of Patent: Oct. 12, 2004

(54) METHOD FOR MEASURING DISTANCE

(75) Inventors: Michael Schlick, Leonberg (DE); Dirk Schmid, Simmozheim (DE); Jens Schick, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/219,228

(22) Filed: Aug. 15, 2002

(65) Prior Publication Data

US 2003/0052795 A1 Mar. 20, 2003

(30) Foreign Application Priority Data

Aug. 17, 2001 (GB) .......................... 101 40 346

(51) Int. Cl.⁷ ............................. G01S 15/34; G08G 1/16
(52) U.S. Cl. ......................... 367/101; 367/99; 340/903
(58) Field of Search ..................... 367/99–102; 340/903, 340/435

(56) References Cited

U.S. PATENT DOCUMENTS

| 4,376,990 | A | * | 3/1983 | Metchev ....................... 367/101 |
| 4,613,231 | A | * | 9/1986 | Wichmann ...................... 367/99 |
| 4,674,069 | A | * | 6/1987 | Mizuno ........................ 340/943 |
| 5,793,704 | A | * | 8/1998 | Freger .......................... 367/98 |
| 6,122,602 | A | * | 9/2000 | Michalski et al. ............. 367/99 |
| 6,191,724 | B1 | * | 2/2001 | McEwan ....................... 342/118 |
| 6,445,285 | B1 | * | 9/2002 | Sparling ....................... 340/435 |

FOREIGN PATENT DOCUMENTS

| DE | 34 09 767 | 9/1985 |
| DE | 198 30 684 | 3/2000 |
| EP | 0 732 598 | 9/1996 |
| EP | 0 797 105 | 9/1997 |

* cited by examiner

Primary Examiner—Ian J. Lobo
(74) Attorney, Agent, or Firm—Kenyon & Kenyon

(57) ABSTRACT

Proposed is a method for measuring distance, which improves the resolution and the selectivity in an echo method, using propagation-time measurement. In this context, a received signal is sampled without first having to smooth the signal.

13 Claims, 3 Drawing Sheets

METHOD FOR MEASURING DISTANCE

FIELD OF THE INVENTION

The present invention relates to a method for measuring distance.

BACKGROUND INFORMATION

In particular, methods for measuring distance with the aid of an ultrasonic echo method are already known, where an ultrasonic signal is generated by an ultrasonic sensor, this signal is reflected by an obstacle, and the reflected signal is received again by a receiver. The received signal is amplified, rectified, and fed to a low-pass filter. The low-pass filtering smooths the received signal. The emitted signal is generally made up of a wave packet having several periods of ultrasonic oscillation from the ultrasonic sensor. This results in divergence of the signal, even when the signal is as concentrated as possible. In order to determine a propagation time as accurately as possible, the time of the signal emission is compared to a maximum of the wave packet received. To this end, the maximum of the low-pass filter output signal, which constitutes an envelope curve for an amplitude function of the signal received, is determined. However, analog components are needed for the low-pass filtering. In this context, it is only possible to reconstruct the envelope in an incomplete manner. Analog low-pass filters that can be produced with a justifiable amount of expenditure have only a low order and result in either the ultrasonic frequency being disadvantageously suppressed or the envelope being widened, depending on the frequency limit set for the low-pass filter. The maximum possible selectivity of an ultrasonic receiver is reduced by both of the effects. Therefore, several closely staggered objects can no longer be detected as separate objects since, in each case, the envelope curves run into each other. The accuracy of the distance measurement is particularly reduced in response to the occurrence of interference signals.

SUMMARY OF THE INVENTION

In contrast, the method of the present invention possesses the advantage, that the use of a low-pass filter may be eliminated by sampling the received signal at its frequency or a multiple of its frequency, preferably a whole-number multiple. In this context, the frequency of the received signal approximately corresponds to the frequency of the emitted signal. Therefore, the elimination of an analog low-pass filter increases the maximum possible selectivity, one being able to dispense with analog components. The signal processing may instead be carried out in an advantageous manner, using digital components.

It is particularly advantageous to synchronize the received signal, using a PLL stage (phase-locked loop). By this way, the sampling of the received signal may be precisely synchronized to the acoustic frequency of the received signal. Thus, small frequency shifts, such as those caused by the Doppler effect as a result of movement of the obstacle or the vehicle, may be compensated for. In particular, this allows the waveform to be sampled as precisely as possible at the locations of the maxima.

In addition, it is particularly advantageous to evaluate the maxima, since the absolute maximum of the received signal packet may be determined by comparing the maxima of the received signal. The absolute maximum may be determined at an accuracy given by the frequency of the signal. The propagation time of the signal, and therefore the distance, may be calculated from the time of the absolute maximum.

It is also advantageous to digitize the data of the received signal and transmit these data to an evaluation unit. By this way, receiving units may advantageously be connected by a digital bus system to an evaluation unit, which is situated at a suitable position in the vehicle. In this context, digital data may be reliably transmitted, whereby, in particular, a bus system already present in the vehicle may be utilized. This especially simplifies the connection of a multitude of receiving units to an evaluation unit.

Furthermore, is advantageous to control the PLL using a frequency generator because, by this way, the building-up transient is shortened, since there is, in general, only one phase shift between the received signal and oscillating frequency of the PLL. In this context, it is particularly advantageous to use the frequency generator to generate the signal to be emitted, as well, so that a transmitting and receiving unit only needs one frequency generator.

Furthermore, it is advantageous to rectify the signal and determine the maxima of the rectified signal. Sampling is done at two times the frequency, but this further increases the resolution so that maxima may be ascertained more accurately.

DETAILED DESCRIPTION

The present invention may be used in different echo methods for determining a distance. The present invention is particularly advantageous, when a signal pulse made up of several variable-amplitude wave packets of a signal is received, and the time of the signal maximum of the wave packet should be determined as accurately as possible. The present invention is especially used for determining a distance with the aid of an ultrasonic-echo measuring method. However, the present method may also be applied to optical measuring methods using electromagnetic waves in a visible or invisible frequency range. The present invention will now be explained on the basis of an ultrasonic-echo method for measuring distance, using a transmitting and receiving unit situated in a motor vehicle.

Figure 1:
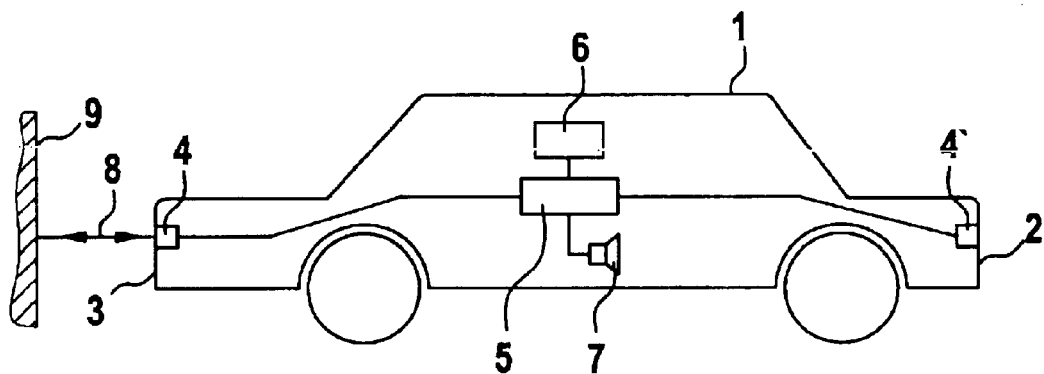
FIG. 1 shows a motor vehicle having an evaluation unit and transmitting and receiving units.

Represented in FIG. 1 is a motor vehicle 1, on whose front end 2 and rear end 3 ultrasonic transmitting and receiving units 4, 4' are situated. In this context, ultrasonic transmitting and receiving units 4, 4' are designed in such manner, that they may emit ultrasonic signals in a first state and receive ultrasonic signals in a second state. Ultrasonic transmitting and receiving units 4, 4' are controlled by a central evaluation unit 5, which is situated at a suitable position in the vehicle. In this context, evaluation unit 5 is preferably designed to be able to evaluate data from several ultrasonic transmitting and receiving units. Transmitting and receiving units may also be situated on the sides of the vehicle. In addition, other distance-measuring devices, e.g. radar measuring devices, may be positioned in the vehicle and connected to evaluation unit 5, as well. However, such additional distance sensors are not represented in FIG. 1. Evaluation unit 5 is connected to a display 6 and a loudspeaker 7.

In FIG. 1, an ultrasonic signal 8, which is emitted by the transmitting and receiving unit 4 on the rear end of the vehicle, is reflected by an obstacle 9 and reflected back to transmitting and receiving unit 4. A data signal regarding the received and the emitted signal, in particular regarding the time displacement between the emitted and the received signal, is transmitted to evaluation unit 5, which calculates the distance of motor vehicle 1 to obstacle 9 from the signal propagation time. The distance is indicated in display 6. If the distance falls below a predetermined distance, then an optical and/or acoustic warning is output in display 6 and preferably by loudspeaker 7, to the driver of the motor vehicle.

Figure 2:
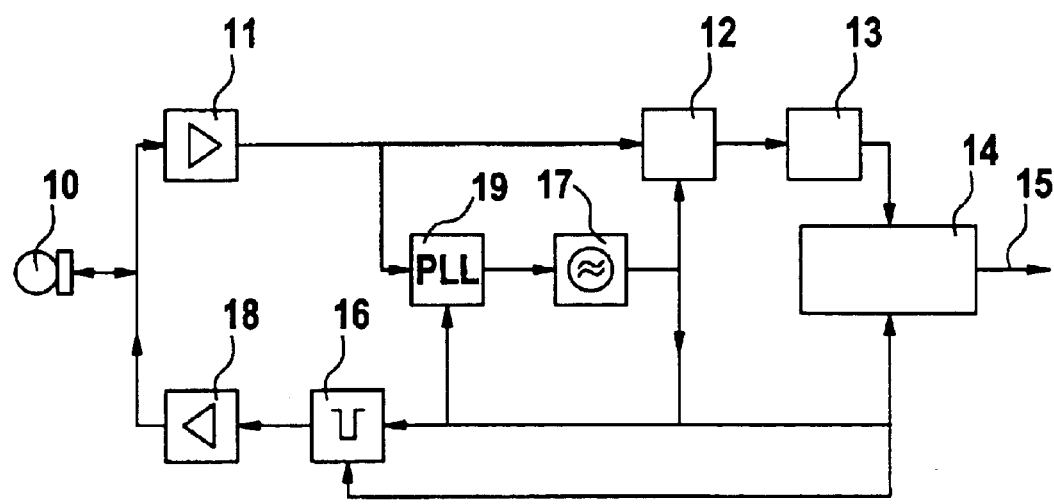
FIG. 2 shows a circuit of a transmitting and receiving unit for implementing the method of the present invention.

In FIG. 2, transmitting and receiving unit 4 is represented in detail as an electronic circuit. In this context, transmitting and receiving unit 4 is preferably situated in a suitable housing at rear end 3 of motor vehicle 1, e.g. at the level of a bumper of vehicle, and connected to evaluation unit 5 via electrical connections. Transmitting and receiving unit 4 includes an electroacoustic transducer 10, which is induced to emit ultrasonic signals in the first state of sending and transmitting unit 4, by applying a voltage. In the second state, incident ultrasonic waves bring about an oscillation in electroacoustic transducer 10, which is converted to a voltage signal by the electroacoustic transducer. The received voltage signal is transmitted to a first amplifier unit 11, which amplifies the voltage signal obtained from the ultrasonic signal. The output of first amplifier unit 11 is connected to the input of a sampling stage 12. Sampling stage 12 samples the voltage signal applied to the input, when it is induced to do so by a trigger signal. Until the next instance of sampling occurs, the sampled signal is applied to an output of sampling stage 12, which is connected to an analog-to-digital converter 13. Analog-to-digital converter 13 converts the signal received from sampling stage 12 to a digital signal, which is transmitted to a control unit 14. Sampling stage 12 is such that it registers the maximum applied voltage until the next trigger signal is received, and outputs the voltage to analog-to-digital converter 13 after a trigger signal is received. Control unit 14 is preferably designed as a semiconductor device, e.g. as an adaptable integrated circuit (ASIC) or a microprocessor. Control unit 14 transmits the digitized signal through a data line 15 to evaluation unit 5, in which the distance is calculated from the signal propagation time. Furthermore, control unit 14 specifies when an ultrasonic echo pulse is emitted by electroacoustic transducer 10, so that both the emission time and reception time of the signal are available in control unit 14.

In order to emit a signal, control unit 14 activates a pulse-generation unit 16, which, for a short time, outputs a signal pulse of an ultrasonic signal generated by frequency generator 17, to a second amplifier unit 18. The output of second amplifier unit 18 is connected to electroacoustic transducer 10, which then emits the ultrasonic signal. In a first exemplary embodiment, a signal is transmitted to first amplifier unit 11 as long as an ultrasonic signal is output. In a further exemplary embodiment, the emitted signal may be measured via the connection of first amplifier unit 11, so that the emitted signal is also available before the reflected, received signal, in order to determine the propagation time. Sampling stage 12 is preferably triggered by a signal, which is emitted by frequency generator 17 and has the frequency of the ultrasonic signal or an integral multiple of this frequency. In this case, frequency generator 17 is controlled by a PLL stage 19 (phase-locked loop). PLL stage 19 is coupled to the output of first amplifier unit 11, so that a trigger signal is output by PLL stage 19 to frequency generator 17 in the event of a maximum in the signal output by first amplifier unit 11. The PLL stage 19 itself is connected to an output of frequency generator 17, so that an additional feedback at the output frequency of frequency generator 17 occurs, and the signal received from first amplifier unit 11 is only used for fine adjustment. PLL stage 19 corrects the phase shift between the received signal and the sampling rate, which means that, after the building-up transient of a control loop of PLL stage 19 occurs, the signal may be sampled precisely at the maxima. In the event of a movement of obstacle 9 and/or of motor-vehicle 1, the fine adjustment also allows small shifts in frequency caused by the Doppler effect to be compensated for.

Figure 3:
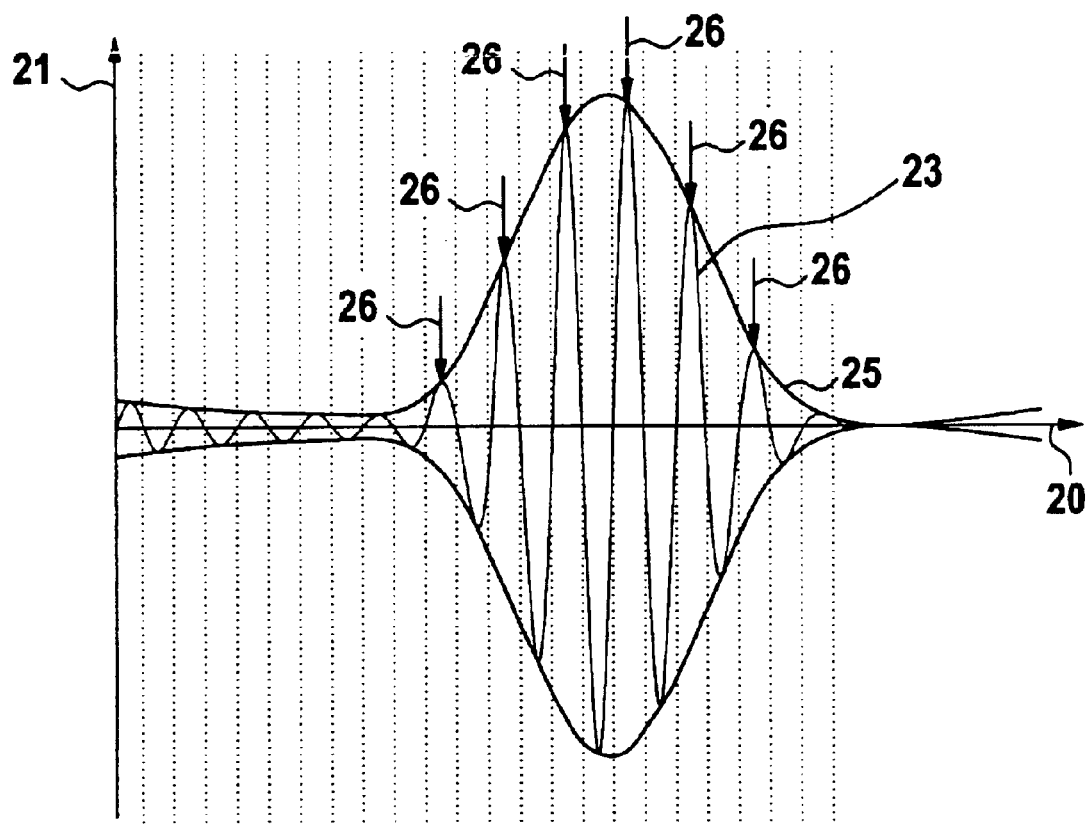
FIG. 3 shows a first exemplary embodiment for the scanning of a received signal.

An exemplary embodiment for the sampling of an ultrasonic signal is represented in FIG. 3. On a y axis 21, the amplitude of the electrical signal 23 obtained from the received ultrasonic signal is plotted along an x axis functioning as a time axis 20, the electrical signal being proportional to the received ultrasonic signal. For the sake of clarity, time axis 20 is subdivided by perpendicular dotted lines 24, which each correspond to half of a signal period. Signal 23 is surrounded on both sides by an envelope curve 25. In the case of a positive amplitude of the ultrasonic signal, local maxima are indicated by arrows 26. In this case, arrow 26' represents the absolute maximum, whereby, within the scope of resolvability, the time represents the time of the maximum signal, depending on the given signal frequency. The time at which the maximum signal is received is evaluated as the propagation time of the signal for the further distance measurement.

Figure 4:
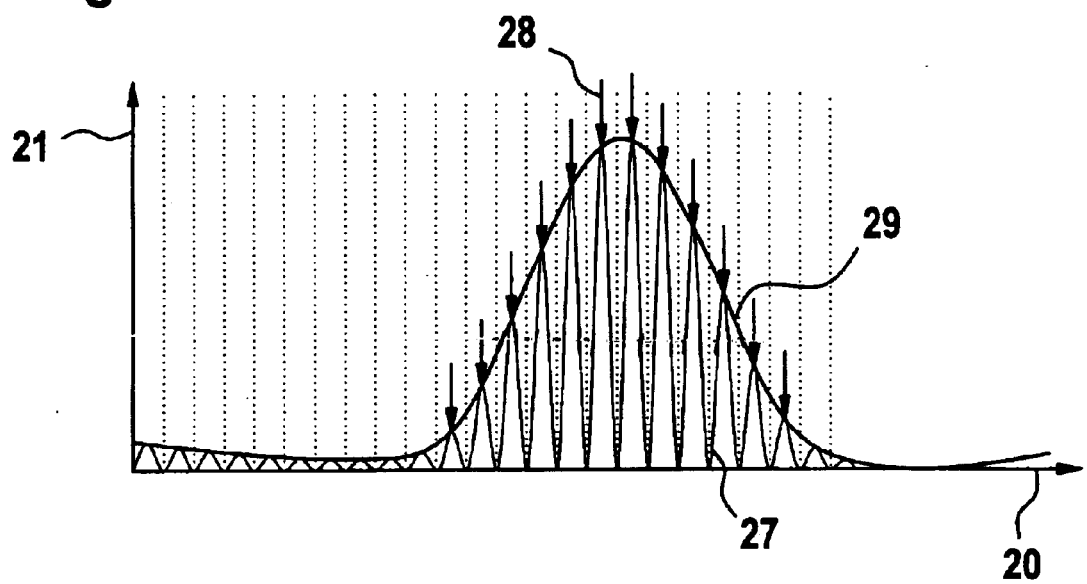
FIG. 4 shows a second exemplary embodiment for the scanning of a rectified, received signal.

A further exemplary embodiment for signal reception is represented in FIG. 4. Above time axis 20, the signal amplitude of the rectified signal is plotted along y axis 21. In order to obtain a rectified signal, a rectifier is integrated into first amplifier unit 11 or connected on the line side or load side of first amplifier unit 11. In comparison to the sampling according to FIG. 3, the sampling rate is to be doubled in this case, in order to more accurately determine a maximum, so that the frequency output by frequency generator 17 is doubled with regard to the input of sampling stage 12. Rectified signal 27 is now sampled twice as often, which is symbolized by arrows 28. For the sake of clarity, only the arrow at the maximum amplitude is provided with a reference numeral. It becomes clear from both FIG. 3 and FIG. 4 that the detailed calculation of an envelope curve 25 and 29 according to FIGS. 3 and 4, respectively, may be omitted without reducing the accuracy of the propagation-time determination, and therefore the distance determination.

Figure 5:
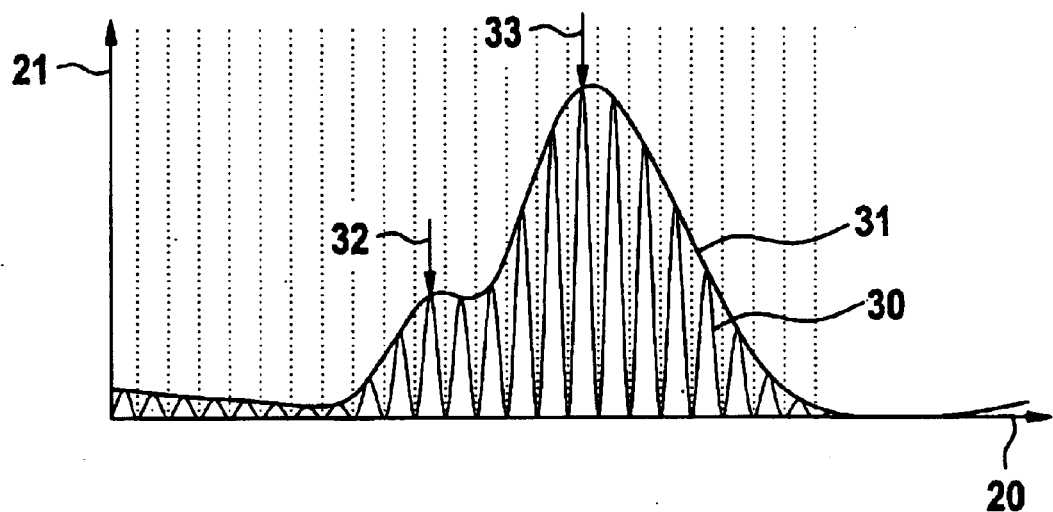
FIG. 5 shows a further exemplary embodiment for the scanning of a rectified, received signal.

FIG. 5 represents a further instance of receiving a rectified signal 30, whose amplitude on y axis 21 is plotted across time axis 20. As an observer may clearly see from envelope curve 31, there is a first maximum 32 and a second maximum 33. Maxima 32 and 33 may be separated cleanly. First maximum 32 indicates that an additional projecting obstacle, e.g. an edge or something similar, is possibly situated in front of the obstacle denoted by second maximum 33, so that a driver is warned even earlier. If an envelope curve 31 becomes too wide, first maximum 32 may be lost in the evaluation, so that no warning about this obstacle would occur. However, the method of the present invention allows detection to occur.

Data is preferably transported from control unit 14 to evaluation unit 5 by a digital data bus. This data bus may be, for example, a single-wire bus, a two-wire bus, or an optical data bus.

In addition to the direct reception of echos by the same ultrasonic transducer, cross-echos, i.e. reflected signals emitted by a first ultrasonic transducer and picked up by a second ultrasonic transducer, may also be received. These may be processed in the same manner as the signals described with the aid of FIGS. 3 through 5. Times for the signal emission and the signal reception are transmitted to evaluation unit 5. The same applies for the case in which the transmitting unit and receiving unit are not identical, but situated next to each other.

A typical parameter for the practical use of the method according to the present invention is an acoustic-frequency period of 20 μs, which corresponds to a frequency of 50 kHz. The distance of an object is obtained from the following equation: The propagation time times the sonic velocity, divided by two. At a frequency of 50 kHz, this yields a distance resolution of approximately 3.4 mm. It is recommended that the length of a transmitted pulse be at least ten periods for one pulse, but preferably at least 15 periods, so that a transmitted pulse is approximately 300 μs long. This gives a separation capability between two spaced obstacles of approximately 50 mm. The accuracy and the selectivity may be increased by increasing the sampling frequency or increasing the transmitting frequency.

What is claimed is:

1. A method for measuring a distance, comprising:
causing a transmitter unit to emit a signal;
reflecting the signal by an obstacle;
causing a receiver unit to receive the signal to produce a received signal;
performing a sampling of the received signal at a frequency thereof;
calculating the distance of the obstacle from a propagation time of the signal;
causing a PLL stage to synchronize the sampling of the received signal; and
measuring and evaluating maxima of an amplitude of the received signal; and
causing a frequency generator to transmit a transmitting frequency to an input of the PLL stage.

2. The method as recited in claim 1, further comprising:
causing the frequency generator to control the transmitter unit.

3. The method as recited in claim 1, further comprising:
digitizing data of the received signal to produce digitized data; and
transmitting the digitized data to an evaluation unit.

4. The method as recited in claim 1, wherein the signal emitted and received is an ultrasonic signal.

5. The method as recited in claim 1, further comprising:
rectifying and sampling the received signal at approximately two times a transmitter frequency.

6. A device arranged on a vehicle and for measuring a distance, comprising:
a plurality of transmitter units, at least one of the transmitter units emitting a signal, the signal being reflected by an obstacle;
a plurality of receiver units, at least one of the receiver units receiving the signal to produce a received signal;
an arrangement for performing a sampling of the received signal at one of a frequency thereof and a multiple of the frequency;
an arrangement for calculating the distance of the obstacle from a propagation time of the signal;
an arrangement for causing a PLL stage to synchronize the sampling of the received signal; and
an arrangement for measuring and evaluating maxima of an amplitude of the received signal; and
an arrangement for causing a frequency generator to transmit a transmitting frequency to an input of the PLL stage.

7. A method for measuring a distance, comprising:
causing a transmitter unit to emit a signal;
reflecting the signal by an obstacle;
causing a receiver unit to receive the signal to produce a received signal;
performing a sampling of the received signal at a multiple of the frequency;
calculating the distance of the obstacle from a propagation time of the signal;
causing a PLL stage to synchronize the sampling of the received signal;
measuring and evaluating maxima of an amplitude of the received signal; and
causing a frequency generator to transmit a transmitting frequency to an input of the PLL stage.

8. The method as recited in claim 7, further comprising:
causing the frequency generator to control the transmitter unit.

9. The method as recited in claim 7, further comprising:
digitizing data of the received signal to produce digitized data; and
transmitting the digitized data to an evaluation unit.

10. The method as recited in claim 7, wherein the signal emitted and received is an ultrasonic signal.

11. The method as recited in claim 7, further comprising:
rectifying and sampling the received signal at approximately two times a transmitter frequency.

12. A method for measuring a distance, comprising:
causing a transmitter unit to emit a signal;
reflecting the signal by an obstacle;
causing a receiver unit to receive the signal to produce a received signal;
performing a sampling of the received signal at a frequency thereof;
calculating the distance of the obstacle from a propagation time of the signal;
measuring and evaluating maxima of an amplitude of the received signal; and
causing a frequency generator to transmit a transmitting frequency to an input of the PLL stage;
wherein the signal emitted and received is an ultrasonic signal.

13. A method for measuring a distance, comprising:
causing a transmitter unit to emit a signal;
reflecting the signal by an obstacle;
causing a receiver unit to receive the signal to produce a received signal;
performing a sampling of the received signal at a multiple of the frequency;
calculating the distance of the obstacle from a propagation time of the signal;
measuring and evaluating maxima of an amplitude of the received signal; and
causing a frequency generator to transmit a transmitting frequency to an input of the PLL stage;
wherein the signal emitted and received is an ultrasonic signal.

* * * * *